United States Patent [19]

Katohno et al.

[11] Patent Number: 4,912,578
[45] Date of Patent: Mar. 27, 1990

[54] TAPE LOADING MECHANISM FOR MAGNETIC RECORDING AND/OR PLAYBACK EQUIPMENTS

[75] Inventors: Noboru Katohno, Mito; Koji Fukuda, Katsuta, both of Japan

[73] Assignees: Hitachi, Ltd., Tokyo; Hitachi Video Engineering, Yokohama, both of Japan

[21] Appl. No.: 177,470

[22] Filed: Apr. 1, 1988

[30] Foreign Application Priority Data

Apr. 1, 1987 [JP] Japan ................................. 62-77448

[51] Int. Cl.⁴ ............................................ G11B 15/66
[52] U.S. Cl. ......................................... 360/85; 360/95
[58] Field of Search ...................................... 380/85, 95

[56] References Cited

U.S. PATENT DOCUMENTS

| 4,060,840 | 11/1977 | Umeda | 360/85 |
|---|---|---|---|
| 4,126,888 | 11/1978 | Hayashi et al. | 360/85 |
| 4,578,725 | 3/1986 | Muller | 360/85 |
| 4,642,713 | 2/1987 | Ohira et al. | 360/85 |

FOREIGN PATENT DOCUMENTS

| 0028928 | 5/1981 | European Pat. Off. . | |
|---|---|---|---|
| 3245470 | 7/1983 | Fed. Rep. of Germany . | |
| 3624576 | 1/1987 | Fed. Rep. of Germany . | |
| 0071849 | 6/1981 | Japan | 360/95 |
| 0113567 | 6/1984 | Japan | 360/85 |
| 0188772 | 8/1986 | Japan | 360/95 |

*Primary Examiner*—Stuart N. Hecker
*Assistant Examiner*—David J. Severin
*Attorney, Agent, or Firm*—Antonelli, Terry & Wands

[57] ABSTRACT

In a tape loading mechanism for recording and/or playback equipment in which a magnetic tape is drawn from a cassette to be wound around a cylinder having a head at a predetermined angle, an elongated member for moving drawing members to draw the magnetic tape from the cassette is disposed and extends in a space between a rotating shaft of a cylinder motor for rotating the cylinder identical with a rotational shaft of the cylinder motor and a capstan motor for rotating a capstan shaft identical with the capstan shaft which feeds the magnetic tape together with a pinch roller.

4 Claims, 4 Drawing Sheets

TAPE LOADING MECHANISM FOR MAGNETIC RECORDING AND/OR PLAYBACK EQUIPMENTS

BACKGROUND OF THE INVENTION

The invention relates to a tape loading mechanism for magnetic recording and/or playback equipment for drawing a magnetic tape from a cassette to wind around a cylinder at a predetermined angle.

In magnetic recording and/or playback equipments of home video-tape recorders and the like, a cassette containing a magnetic tape therein is loaded in a magnetic recording and/or playback equipment and a magnetic tape is automatically drawn from the cassette to be wound around a cylinder having a rotating head so that electric signals are transferred between the magnetic tape and the head by a tape loading mechanism. Various tape loading mechanisms have been proposed and put to practical use and, for example, in Japanese Patent Unexamined Publication No. 52-1134411 and corresponding U.S. Pat. No. 4,126,888 and German Patent Application Laid-open No. 2,719,746. A complex tape loading mechanism is proposed wherein the magnetic recording and/or playback equipment on which the tape loading mechanism is mounted is large and thick. This proposed construction is contrary to recent demands for smaller and thinner magnetic recording and/or playback equipment. Other prior art tape loading mechanisms suffer have complex structure and also the same disadvantage.

SUMMARY OF THE INVENTION

An object of the invention is to provide a tape loading mechanism of which mechanism is simple and thin in construction and is capable of effectively utilizing a dead space in a magnetic recording and/or playback equipment on which the tape loading mechanism is mounted.

A tape loading mechanism for magnetic recording and/or playback equipment according to the invention is includes an elongated member having teeth for moving drawing members which draw a magnetic tape from a cassette reciprocally movably extends in a space between a cylinder motor for rotating a rotating shaft of a cylinder is identical with a rotational shaft of the cylinder motor and a capstan motor for rotating a capstan shaft identical with the capstan shaft.

A tape loading mechanism for video tape recorders for drawing a magnetic tape from a cassette to wind around a cylinder at a predetermined angle according to the invention comprises a motor fixed on a chassis plate and a reduction gear arrangement. The reduction gear arrangement includes a worm driven by the motor and a worm wheel meshing with the worm and rotatably mounted on the chassis plate. A cam gear is meshed with a worm wheel and is rotatably mounted on the chassis plate, with a cam groove being formed in the cam. A rack operating arm is pivotally mounted on the chassis plate and is engaged with the cam groove of the cam gear, with an elongated shaped rack member, having teeth at one end thereof, being pivotally connected to the rack operating arm at the other end thereof and being reciprocally moveable in substantially the elongated direction. The elongated rack member is disposed and extends in a space between a cylinder motor for rotating the cylinder having a shaft identical with a rotational shaft of the cylinder, and a capstan motor for rotating a capstan shaft identical with the capstan shaft. Two gears are provided with one of the gears meshing with the teeth of the elongated rack member, and tape drawing members are respectively fixed to the two gears for drawing the magnetic tape from the cassette.

DETAILED DESCRIPTION OF THE PREFERRED EMBODIMENTS

Figure 1:
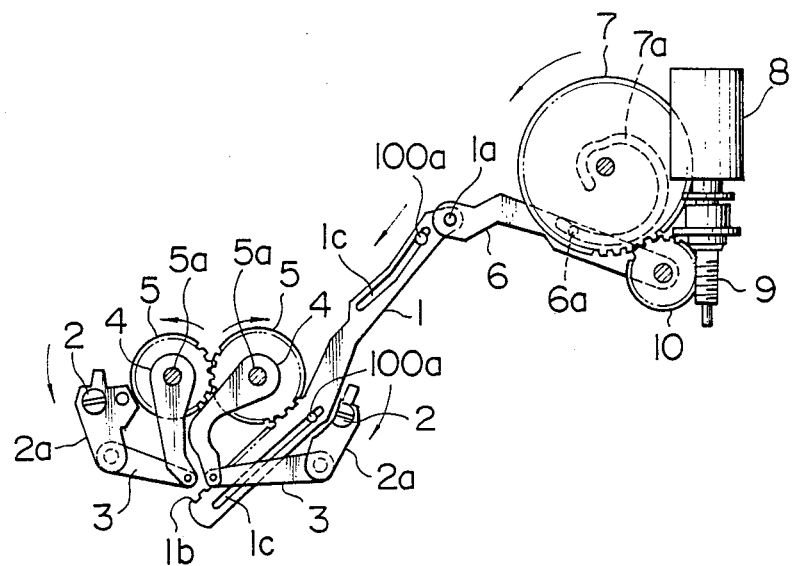
FIG. 1 is a plan view of a tape loading mechanism of the present invention in a state in which a tape is contained in a cassette.
Figure 2:
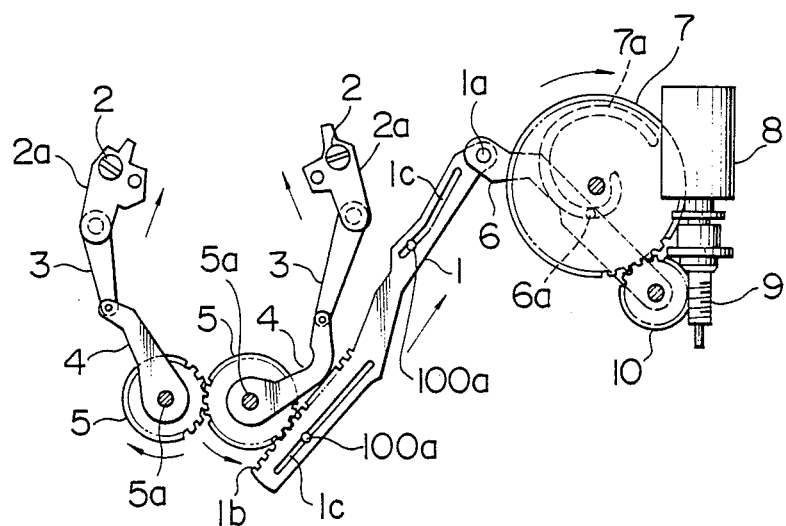
FIG. 2 is a plan view of the tape loading mechanism of FIG. 1 in a state wherein the tape is withdrawn from the cassette.
Figure 3:
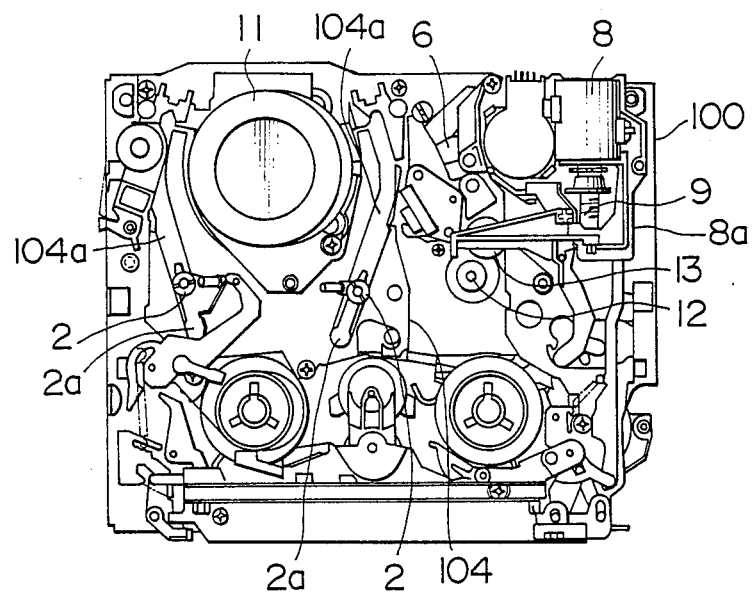
FIG. 3 is a top view of a VTR mechanism in which the tape loading mechanism of the present invention is mounted.
Figure 4:
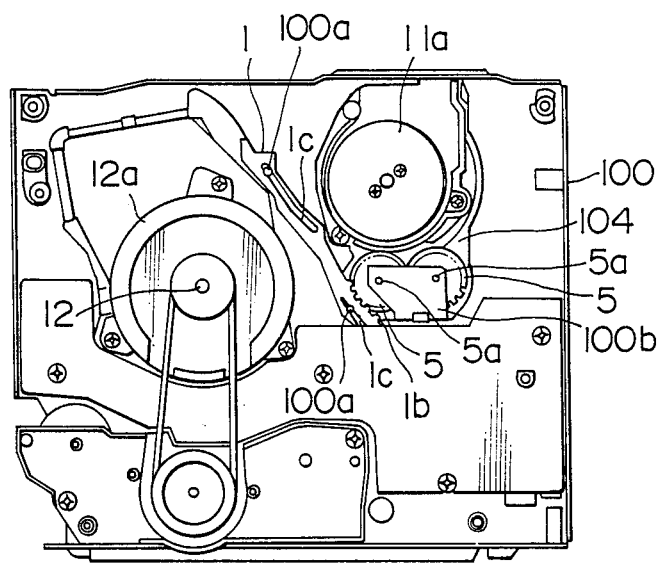
FIG. 4 is a bottom view of the VTR mechanism in which the tape loading mechanism of the present invention is mounted.
Figure 7:
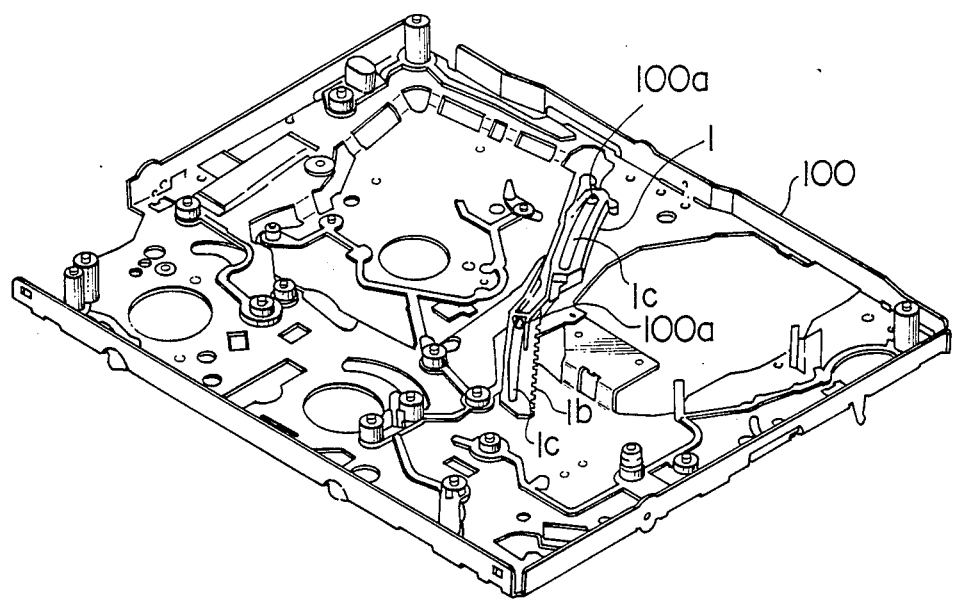
FIG. 7 is a perspective view of a chassis base, as viewed from a bottom side thereof, on which a rack member is mounted.
Figure 8:
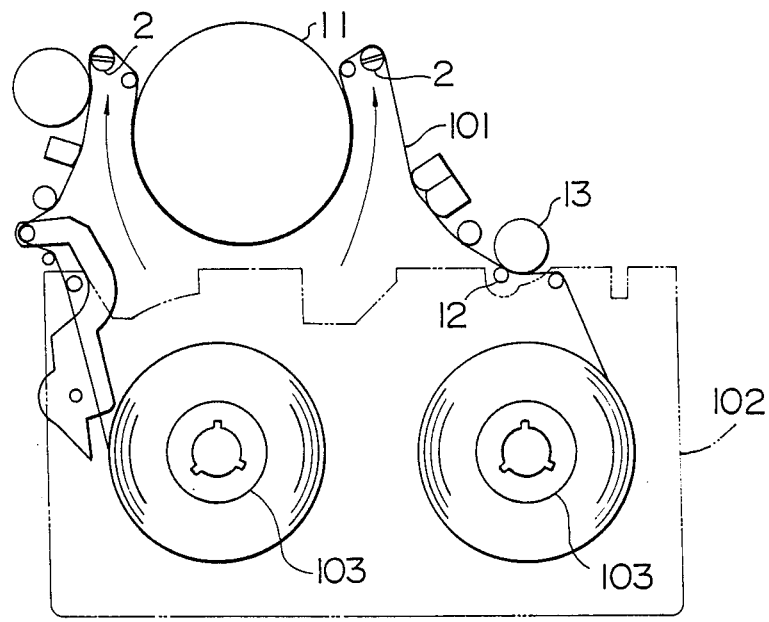
FIG. 8 is a schematic plan view showing a state in which the tape is drawn from the cassette by the tape loading mechanism.

Referring now to the drawings when like reference numerals are used throughout the various views to designate like parts and, more particularly, to FIGS. 3 and 4, according to these figures, a VTR mechanism, upon which a tape loading mechanism of the present invention is mounted, includes chassis pins 100a, 100 a mounted on a bottom side of a chassis base 100, with a guide plate 104 for drawing bases 2a, 2a being fixed on a top side of the chassis base 100 and including guide grooves 104a, 104a in which the drawing bases 2a, 2a are movably arranged. Magnetic tape drawing members 2, 2 are mounted on a top surface of the drawing bases 2a, 2a and the drawing bases 2a, 2a are respectively pivotally connected to one end thereof to links 3, 3 as shown most clearly in FIGS. 1 and 2. The links 3, 3 are pivotally connected to arms 4, 4 at their other ends, respectively, with the arms 4, 4 being respectively fixed to shafts 5a, 5a of gears 5, 5 mounted at the other ends of the arms 4, 4. The gears 5, 5 are secured on the shafts 5a, 5a which are rotatably supported by the guide plate 104 for the drawing bases 2a, 2a and a cut and offset portion 100b of the chassis base 100. Rack member 1 has an elongated shape as shown in FIGS. 1, 2 and 7 and is provided with a pin 1a at one end and teeth 1b at the other end and two elongated holes 1c, 1c for guidance. The rack member 1 is mounted on the chassis base 100 with the elongated holes 1c, 1c fitted to the chassis pins 100a, 100a mounted on the chassis base 100 in such a manner that it can reciprocally move substantially in the direction thereof. The teeth 1b of the rack member 1 mesh with one of the gears 5, 5.

Figure 5:
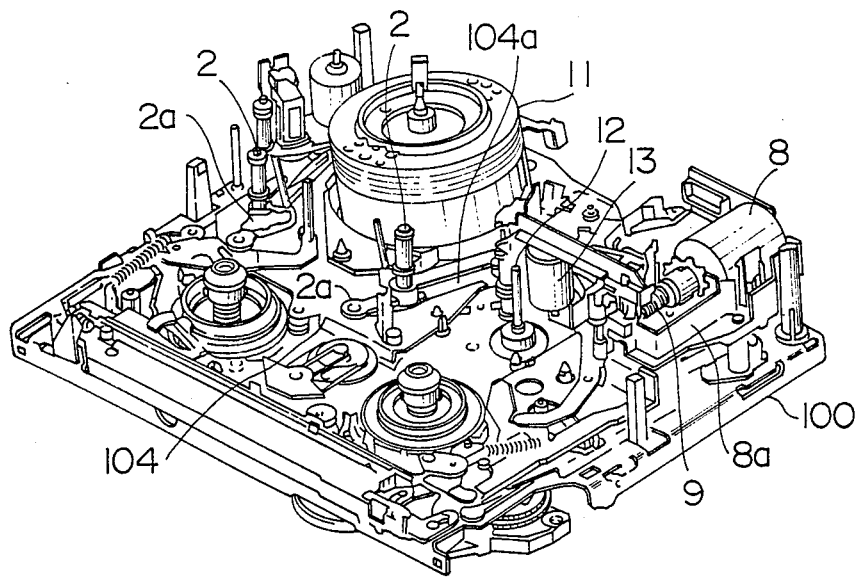
FIG. 5 is a perspective view of the VTR mechanism, as viewed from a top side thereof.

As shown in FIGS. 3 and 5, a motor 8 is fixed on the chassis base 100 by a motor holder 8a, with a worm 9 of a reduction gear arrangement being secured to an output shaft of the motor 8 and meshing with a worm wheel 10 mounted on the chassis base 100 (FIGS. 1 and 2) whereby rotation of the motor 8 is transferred to the worm wheel 10. The rotation of the worm wheel 10 is also transferred to a cam gear 7, having a cam groove 7a rotatably mounted on the chassis base 100 with an arm pin 6a, provided on a rack operating arm 6, being accommodated in the cam groove 7a. The rack operating arm 6 has a rotational shaft provided at one end thereof, with the rotational shaft being a common shaft of the worm wheel 10. The other end of the rack operating arm 6 is pivotally connected to the pin 1a of the rack member 1.

Figure 6:
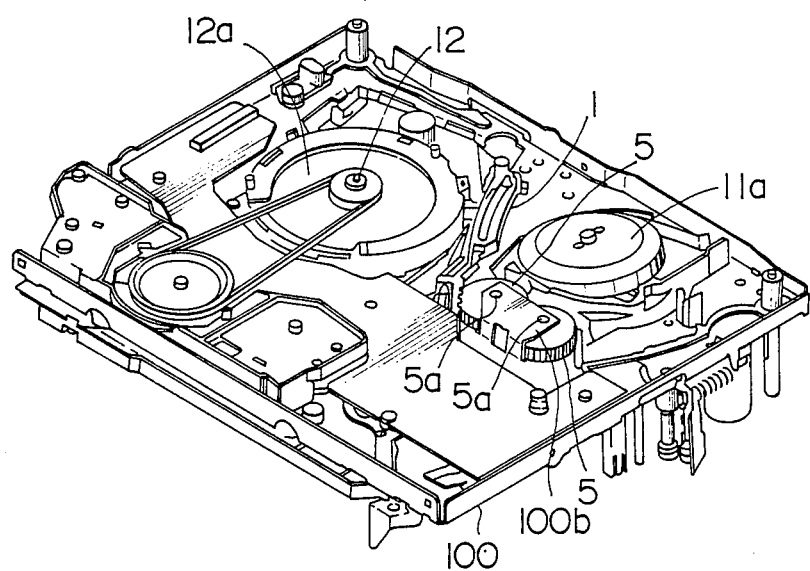
FIG. 6 is a perspective view of the VTR mechanism, as viewed from a bottom side thereof.

As shown in FIGS. 3 and 5 cylinder 11 is mounted on a top side of the chassis base 100 as shown in FIGS. 3 and 5 with a motor 11a for rotating the cylinder 11 being arranged under the cylinder 11 as shown most clearly in FIGS. 4 and 6. A rotating shaft of the motor 11a is identical with a rotating shaft of the cylinder 11. A capstan shaft 12 is provided on a top side of the chassis base 100 as shown in FIGS. 3 and 5 and a capstan motor 12a for rotating the capstan shaft 12 is arranged on a bottom side of the chassis base 100 (FIGS. 4 and 6) of which rotational shaft is the capstan shaft itself. A dead space exists between the capstan motor 12a and the cylinder motor 11a and the rack member 1 extends in the dead space between the cylinder motor 11a and the capstan motor 12a.

In operation, a magnetic tape 101, contained in a cassette 102 in wound state on reels 103, 103, is drawn by the drawing members 2, 2 to be wound around the cylinder 11 having a rotational head at a predetermined angle, thereby transferring electric signals, with the magnetic tape 101 being fed by the capstan shaft 12 and a pinch roller 13 in a conventional manner.

The operation of the tape loading mechanism of the invention will be explained with reference to FIGS. 1 and 2. Due to the rotation of the motor 8, the worm 9 is rotated and the rotation of the worm 9 rotates the worm wheel 10 and then the cam gear 7. The cam groove 7a of the cam gear 7 is engaged with the arm pin 6a of the rack operating arm 6. Accordingly, in a case where, for example, the magnetic tape 101 is drawn from the state shown in FIG. 1 to the state shown in FIG. 2, the cam gear 7 is rotated in a clockwise direction as shown in FIG. 2, so that the rack operating arm 6 is rotated in the clockwise direction in accordance with the displacement of the cam groove 7a and the rack member 1 connected to the rack operating arm 6 is pulled. As the teeth 1b provided on the rack member 1 are meshed with one of the gears 5, 5, the gears 5, 5 are rotated as shown in FIG. 2. Due to the rotation of the gears 5, 5, the drawing bases 2a, 2a are moved from the position shown in FIG. 1 to the position shown in FIG. 2, so that the magnetic tape 101 is drawn from the cassette 102 by the drawing members 2, 2. When the magnetic tape 101 is contained in the cassette 102, the rotation of motor 8 is reversed as shown in FIG. 1 and the rotation of the cam gear 7 is reversed, to effect a containing of the magnetic tape.

According to the invention, as apparent from FIG. 6, it is possible to obtain a tape loading mechanism for the recording and/or playback equipment having a simple structure and capable of making the recording and/or playback equipment thinner since the rack member 1 is disposed and extends in the dead space between the capstan motor 12a and the cylinder motor 11a and on the bottom side of the chassis base 100.

We claim:

1. A tape loading mechanism for video-tape recorders for drawing a magnetic tape from a cassette to wind around a cylinder disposed at a predetermined angle, the tape loading mechanism comprising:
   a motor fixed on a chassis plate,
   a worm driven by said motor,
   a worm wheel rotatably mounted on said chassis plate and meshing with said worm gear,
   a cam gear rotatably mounted on said chassis and meshing with said worm gear, said cam gear having a cam groove formed therein,
   a rack operating arm pivotally mounted on said chassis and engageable with said cam groove of said cam gear,
   an elongated rack member having teeth at one end thereof and pivotally connected to said rack operating arm at the other end thereof, said elongated rack member being reciprocally moveable in substantially an elongated direction, said elongated rack member extending in a space between a cylinder motor for rotating a rotary shaft of said cylinder identical with a rotational shaft of said cylinder motor and a capstan motor for rotating a capstan shaft identical with said capstan shaft,
   two intermeshed gears, one of said gears meshing with said teeth of said elongated rack member, and
   tape drawing members respectively fixed to said two gears for drawing the magnetic tape from the cassette.

2. A tape loading mechanism as claimed in claim 1, wherein said rack member has two elongated holes in which pins provided on said chassis plate are respectively fitted, whereby said elongated rack member is guided for reciprocating movement substantially in the elongated direction.

3. A tape loading mechanism for video-tape recorders for drawing a magnetic tape from a cassette to wind around a cylinder disposed at a predetermined angle, the tape loading mechanism comprising:
   a motor fixed on a chassis plate,
   a reduction gear means driven by said motor,
   a cam rotated by said reduction gear means and having a cam groove formed therein,
   a rack operating arm pivotally mounted on said chassis plate and engaged with said cam groove of said cam,
   an elongated rack member having teeth at one end thereof and pivotally connected to said rack operating arm at the other end thereof and reciprocally moveable in substantially an elongated direction, said elongated rack member extending in a space between a cylinder motor for rotating a rotating shaft of said cylinder identical with a rotational shaft of said cylinder motor and a capstan motor for rotating a capstan shaft identical with said capstan shaft,
   two intermeshed gears, one of said gears meshing with said teeth of said elongated rack member, and
   tape drawing members respectively fixed to said two gears for drawing the magnetic tape from the cassette.

4. A tape loading mechanism as claimed in claim 3, wherein said rack member has two elongated holes in which pins provided on said chassis plate are respectively fitted, whereby said rack member is guided for reciprocating movement substantially in the elongated direction.

* * * * *